(12) United States Patent
Long

(10) Patent No.: US 12,314,764 B1
(45) Date of Patent: May 27, 2025

(54) DIFFERENTIAL CONTROL OF AGGREGATED CRYPTOGRAPHIC HARDWARE ASSETS

(71) Applicant: Auradine Inc., Santa Clara, CA (US)

(72) Inventor: Marshall Long, Sugarland, TX (US)

(73) Assignee: Auradine Inc., Santa Clara, CA (US)

( * ) Notice: Subject to any disclaimer, the term of this patent is extended or adjusted under 35 U.S.C. 154(b) by 0 days.

(21) Appl. No.: 18/680,247

(22) Filed: May 31, 2024

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | | | |
|---|---|---|---|---|
| 7,069,117 B2* | 6/2006 | Wilson | ..................... | H02J 3/144 713/320 |
| 8,984,523 B2* | 3/2015 | Vajda | ..................... | G06F 1/3287 713/323 |
| 9,798,335 B2* | 10/2017 | Poornachandran | ..................... | G05D 23/1917 |
| 9,921,633 B2* | 3/2018 | Bodas | ..................... | H04L 47/83 |
| 11,397,999 B2 | 7/2022 | McNamara et al. | | |
| 11,493,981 B1* | 11/2022 | Ma | ..................... | G06F 1/3296 |
| 11,581,734 B2 | 2/2023 | McNamara et al. | | |
| 11,594,888 B2 | 2/2023 | McNamara et al. | | |
| 11,631,138 B2* | 4/2023 | Fresa | ..................... | G06F 1/3296 713/300 |
| 11,650,639 B2 | 5/2023 | McNamara et al. | | |
| 11,669,144 B2 | 6/2023 | McNamara et al. | | |
| 11,669,920 B2 | 6/2023 | McNamara et al. | | |
| 11,953,959 B1* | 4/2024 | Landry | ..................... | G06F 1/3206 |
| 2002/0078391 A1* | 6/2002 | Yeh | ..................... | G06F 1/324 713/322 |
| 2003/0076154 A1* | 4/2003 | Shakeri | ..................... | H03K 19/0016 327/534 |
| 2005/0108582 A1* | 5/2005 | Fung | ..................... | G06F 1/3209 713/300 |

(Continued)

OTHER PUBLICATIONS

Yuen et al.; "Adaptive Overclocking Mining Algorithm Selection Approach in the Cryptocurrency Mining Pool"; ACM 2022; https://doi.org/10.1145/3581971.3581978 (Yuen_2022.pdf; pp. 50-56) (Year: 2022).*

(Continued)

*Primary Examiner* — Hiren P Patel
(74) *Attorney, Agent, or Firm* — Fish & Richardson P.C.

(57) ABSTRACT

A method includes: receiving, through a user interface at a computer system, information indicating a change to one or more aggregate operational parameters for cryptographic hardware assets remote from the computer system and communicatively coupled to the computer system through one or more networks; obtaining one or more hardware parameters for one or more of the cryptographic hardware assets; based on the one or more hardware parameters, identifying a subset of the cryptographic hardware assets to receive one or more adjustments to one or more computing parameters to cause the change to the one or more aggregate operational parameters; and sending instructions to the subset of the cryptographic hardware assets to effect the adjustment to the one or more computing parameters.

21 Claims, 8 Drawing Sheets

(56) References Cited

U.S. PATENT DOCUMENTS

| | | | | |
|---|---|---|---|---|
| 2009/0138737 | A1* | 5/2009 | Kim | G06F 1/324 |
| | | | | 713/322 |
| 2012/0011377 | A1* | 1/2012 | Yu | G06F 1/206 |
| | | | | 713/300 |
| 2013/0166094 | A1* | 6/2013 | Eckberg | H05K 7/20836 |
| | | | | 700/300 |
| 2014/0222242 | A1* | 8/2014 | Poornachandran | G06F 1/206 |
| | | | | 700/300 |
| 2015/0331433 | A1* | 11/2015 | Naffziger | G06F 1/324 |
| | | | | 700/300 |
| 2017/0083074 | A1* | 3/2017 | Piga | G06F 1/329 |
| 2017/0293340 | A1* | 10/2017 | Park | G06F 1/329 |
| 2019/0080411 | A1* | 3/2019 | Pierce | G06Q 20/36 |
| 2021/0192619 | A1* | 6/2021 | Wu | G06F 1/20 |
| 2021/0326188 | A1* | 10/2021 | Hsu | G06F 1/206 |
| 2023/0037377 | A1* | 2/2023 | Fresa | G06Q 40/06 |
| 2023/0169595 | A1* | 6/2023 | Fresa | G06F 1/3296 |
| 2024/0144249 | A1* | 5/2024 | Swami | G06Q 20/3678 |
| 2024/0152176 | A1* | 5/2024 | Beck | G06F 1/10 |
| 2024/0162746 | A1* | 5/2024 | Billingsley, Jr. | H02J 3/381 |
| 2024/0232221 | A1* | 7/2024 | Khan | G06F 16/27 |
| 2024/0288850 | A1* | 8/2024 | Sheng | G05B 19/4155 |

OTHER PUBLICATIONS

Shuaib et al.; "A Novel Optimization for GPU Mining Using Overclocking and Undervolting"; Sustainability 2022, 14, 8708. https://doi.org/10.3390/su14148708; (Shuaib_2022.pdf; pp. 1-15) (Year: 2022).*

Sukharev et al.; "Hardware Overclocking to Improve the Efficiency of Ethereum Cryptocurrency Mining"; 978-1-7281-5761-0/20, IEEE 2020; (Sukharev_2020.pdf; pp. 1873-1877) (Year: 2020).*

U.S. Appl. No. 18/239,977, Carlson et al., filed Aug. 30, 2023.

* cited by examiner

DIFFERENTIAL CONTROL OF AGGREGATED CRYPTOGRAPHIC HARDWARE ASSETS

FIELD OF THE DISCLOSURE

This specification relates to cryptographic hashing operations, such as cryptocurrency mining.

BACKGROUND

A large number of cryptographic hardware assets (e.g., computers that perform computation tasks for cryptographic operations, such as mining cryptocurrencies, among other applications) can be aggregated together and managed in a common system. Management of cryptographic hardware assets can depending on current market conditions.

SUMMARY

Some aspects of this disclosure describe a method that includes: receiving, through a user interface at a computer system, information indicating a change to one or more aggregate operational parameters for cryptographic hardware assets remote from the computer system and communicatively coupled to the computer system through one or more networks; obtaining one or more hardware parameters for one or more of the cryptographic hardware assets; based on the one or more hardware parameters, identifying a subset of the cryptographic hardware assets to receive one or more adjustments to one or more computing parameters to cause the change to the one or more aggregate operational parameters; and sending instructions to the subset of the cryptographic hardware assets to effect the adjustment to the one or more computing parameters.

This and other methods described herein can have one or more of at least the following characteristics.

In some implementations, the one or more computing parameters include at least one of a clock frequency or a supply voltage.

In some implementations, the one or more hardware parameters include at least one of an internal chip temperature, a hash rate, a hash efficiency, or a power consumption.

In some implementations, the one or more hardware parameters include real-time hardware parameters.

In some implementations, the one or more aggregate operational parameters include at least one of aggregate power consumption by the cryptographic hardware assets or an aggregate mining rate of the cryptographic hardware assets.

In some implementations, sending instructions to the subset of the cryptographic hardware assets includes causing a first adjustment to a first cryptographic hardware asset of the subset of the cryptographic hardware assets and a second adjustment to a second cryptographic hardware asset of the subset of the cryptographic hardware assets. The first adjustment is different from the second adjustment.

In some implementations, sending instructions to the subset of the cryptographic hardware assets includes: increasing a hash rate of the subset of the cryptographic hardware assets and increasing power consumption by the subset of the cryptographic hardware assets, or decreasing the hash rate of the subset of the cryptographic hardware assets and decreasing the power consumption by the subset of the cryptographic hardware assets.

In some implementations, the change to the one or more aggregate operational parameters includes at least one of a target aggregate power consumption, a target aggregate mining rate, or a target energy source mix.

In some implementations, the information indicating the change to the one or more aggregate operational parameters includes an indication that the change should be performed when a condition is satisfied, and sending instructions to the subset of the cryptographic hardware assets to effect the adjustment is performed in response to determining that the condition is satisfied.

In some implementations, the condition is based on at least one of an energy price or a cryptocurrency price.

In some implementations, the method includes obtaining the one or more hardware parameters using internal sensors of the cryptographic hardware assets.

In some implementations, the method includes sending instructions to the subset of the cryptographic hardware assets to effect the adjustment includes decreasing a mining rate of a first cryptographic hardware asset of the subset without disabling mining by the first cryptographic hardware asset.

In some implementations, the information indicating the change to the one or more aggregate operational parameters includes a strategy for resolving a constrained optimization problem. The constrained optimization problem represents a tradeoff between increased amounts of both mined cryptocurrency and energy consumption associated with adjusting the one or more computing parameters to increase a mining rate of the subset of the cryptographic hardware assets.

In some implementations, the method includes identifying the subset of the cryptographic hardware assets based on ambient temperatures of the subset of the cryptographic hardware assets.

In some implementations, the cryptographic hardware assets are located at a common facility, and identifying the subset of the cryptographic hardware assets is based on locations of the subset of the cryptographic hardware assets within the common facility.

In some implementations, the cryptographic hardware assets are distributed across a plurality of facilities remote from one another. The subset of the cryptographic hardware assets includes at least one cryptographic hardware asset at each of two or more facilities of the plurality of facilities.

In some implementations, the cryptographic hardware assets include multiple distinct sets of cryptographic hardware assets associated with multiple corresponding entities. The multiple corresponding entities include a first entity providing the information indicating the change to the one or more aggregate operational parameters, and the subset of the cryptographic hardware assets includes at least one cryptographic hardware asset associated with the first entity and at least one cryptographic hardware asset associated with another entity.

In some implementations, the one or more adjustments to the one or more computing parameters cause load-balancing among the cryptographic hardware assets.

Some aspects of this disclosure describe a system, e.g., a system that can perform and/or be used to perform the foregoing and other methods described herein. The system includes: cryptographic hardware assets configured to perform hashing operations, and a control system remote from the cryptographic hardware assets and communicatively coupled to the cryptographic hardware assets through one or more networks. The control system is configured to perform operations including: receiving, through a user interface, information indicating a change to one or more aggregate operational parameters for the cryptographic hardware assets, obtaining one or more hardware parameters for one or more of the cryptographic hardware assets, based on the one or more hardware parameters, identifying a subset of the cryptographic hardware assets to receive one or more adjustments to one or more computing parameters to cause the change to the one or more aggregate operational parameters, and sending instructions to the subset of the cryptographic hardware assets to effect the adjustment to the one or more computing parameters.

Some aspects of this disclosure describe another method. The method includes: receiving, through a user interface at a computer system, information indicating a change to at least one of aggregate power consumption or aggregate hash rate by a plurality of cryptographic hardware assets remote from the computer system and communicatively coupled to the computer system through one or more networks; obtaining at least one of a real-time internal chip temperature or a real-time power consumption for each of a first cryptographic hardware asset of the cryptographic hardware assets and a second cryptographic hardware asset of the cryptographic hardware assets; and, based on the at least one of the real-time internal chip temperature or the real-time power consumption for each of the first cryptographic hardware asset and the second cryptographic hardware asset, sending instructions to the first cryptographic hardware asset and the second cryptographic hardware asset to effect the change to the at least one of aggregate power consumption or aggregate hash rate by the cryptographic hardware assets. The instructions cause a first adjustment to at least one of clock frequency or supply voltage for the first cryptographic hardware asset. The instructions cause a second adjustment to at least one of clock frequency or supply voltage for the second cryptographic hardware asset. The first adjustment and the second adjustment result in each of the first cryptographic hardware asset and the second cryptographic hardware asset performing hash operations. The first adjustment is different from the second adjustment.

The details of one or more implementations are set forth in the accompanying drawings and the description below. Other aspects, features and advantages will be apparent from the description and drawings, and from the claims.

DETAILED DESCRIPTION

This disclosure relates to processes and systems for tuning cryptographic hardware assets. Cryptographic hardware assets may be aggregated into systems of multiple cryptographic hardware assets, localized at one facility and/or spread throughout multiple remote locations. Cryptomining by the aggregate system may be controlled in response to market conditions, e.g., cryptocurrency prices and/or energy prices. For example, when spot energy prices are relatively low, it may make financial sense to increase cryptomining activities, e.g., bring additional cryptographic hardware assets online. This control can be performed using a software layer that communicates with the system of multiple cryptographic hardware assets to control the cryptographic hardware assets.

The software layer may obtain data from the cryptographic hardware assets and control the cryptographic hardware assets as uniform, aggregated computing units, without consideration of asset-to-asset variation. However, this approach may neglect the substantial power efficiencies and computational efficiencies that can be gained by access to hardware parameters, such as internal chip temperatures, for individual cryptographic hardware assets. Aggregate, software-focused cryptomining management may also neglect efficiencies that can be gained by control of low-level computing parameters such as clock frequency and supply voltage.

Accordingly, some implementations of this disclosure provide fine, differential control of aggregated cryptographic hardware assets based on access to hardware parameters. An instruction regarding the aggregate behavior of a system of multiple cryptographic hardware assets can be translated into different control of different cryptographic hardware assets, improving energy efficiency and mining outcomes. For example, in response to a blanket instruction to decrease system power consumption by 10%, a first cryptographic hardware asset may be controlled to have a lower clock frequency, a second cryptographic hardware asset may be controlled to have a lower supply voltage, a third cryptographic hardware asset may not be adjusted, a fourth cryptographic hardware asset may be controlled to have a lower supply voltage that is different from the lower supply voltage of the second cryptographic hardware asset, etc. These adjustments can be made on-the-fly, based on real-time hardware parameters, in response to inputs provided through an accessible, easy-to-understand user interface.

Figure 1:
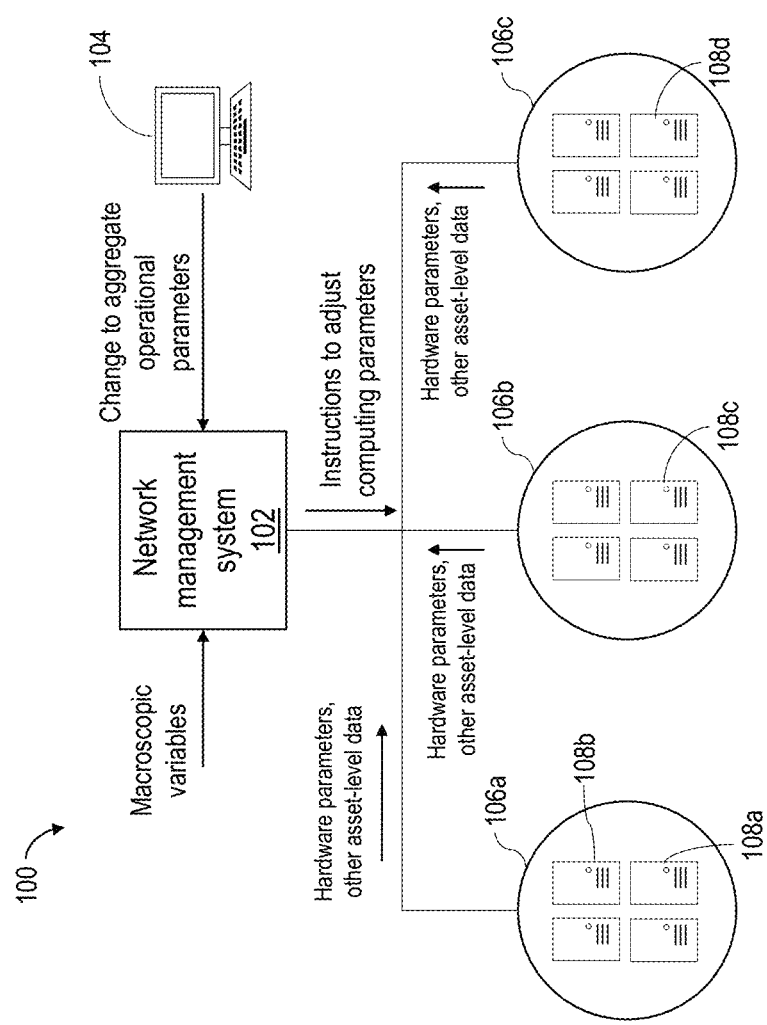
FIG. 1 is a diagram illustrating an example of a cryptomining system.

FIG. 1 illustrates an example of a cryptomining system 100 according to some implementations of the present disclosure. The cryptomining system 100 includes a network management system 102 that controls operations of the cryptomining system 100, as discussed in further detail below. The network management system 102 can be a computing system such as a cloud computing system, e.g., including one or more computers, servers, storage media, processors, etc., in one or more locations. The network management system 102 can be configured to perform operations, e.g., based on including computer-readable media storing instructions that, when executed, cause processor(s) of the network management system 102 to perform the operations.

In some implementations, the network management system 102 includes or is an asset management server, sometimes referred to as a Fleet Management Console (FMC), that can be a dedicated hardware device or data center in a central location, or a cloud server dispersed over one or more locations. The server is configured to transmit and receive data to and from cryptographic hardware assets 108 in the system 100, which may be housed in multiple different data centers, to perform individual or group-based asset control. In general, the asset management server can manage any number of cryptographic hardware assets, e.g., one thousand, ten thousand, one hundred thousand, one million, or more assets.

The system 100 further includes multiple sets 106*a*, 106*b*, 106*c* (referred to collectively as sets 106) of cryptographic hardware assets, such as cryptographic hardware assets 108*a*, 108*b*, 108*c*, 108*d* (referred to collectively as cryptographic hardware assets 108). The cryptographic hardware assets 108 within each set 106 have one or more predetermined relationships with one another. For example, in some implementations, the cryptographic hardware assets 108 within each set 106 are co-located with one another, e.g., in a common facility or data center, such as a common cryptomining farm at a single location. For example, at least some of the sets 106 can be remote from one another, e.g., distributed across multiple facilities or data centers, which may be located in one or multiple geographic regions such as cities, state/provinces, and/or countries.

In some implementations, the cryptographic hardware assets 108 within each set 106 are associated with distinct entities, for example, are assigned to/controlled by distinct users, firms, etc. An entity can provide instructions for the configuration of the cryptographic hardware assets 108 in the set 106 assigned to the entity, and, in response, the network management system 102 can adjust computing parameters of the cryptographic hardware assets 108 in the set 106 and/or other cryptographic hardware assets 106, as discussed in further detail below.

As used herein, a cryptographic hardware asset refers to any computer, miner, or electronic circuit that is configured to perform a cryptographic hashing operation. For example, the cryptographic hashing operation can be a cryptocurrency mining operation, and this disclosure describes the cryptographic hardware assets in that context, without loss of generality. For example, in some implementations the cryptographic hardware assets can performing hashing calculations, or other cryptographic calculations, that need not be associated with a cryptocurrency. In some implementations, each cryptographic hardware asset 108 includes multiple integrated circuit (IC) chips, e.g., application-specific integrated circuits (ASICs), that can efficiently perform tasks related to the hashing operation. The cryptographic hardware asset 108 can also include a computer processing unit (CPU) for providing instructions to the IC chips to perform the hashing operations, as well as for performing other tasks related to the mining operation, e.g., arithmetic and logic operations. The cryptographic hardware asset 108 may include additional circuitry such as an oscillator to synchronize the IC chips with a clock signal. In some implementations, each cryptographic hardware asset 108 is configured as a discrete unit separate from other cryptographic hardware assets 108, e.g., included in a corresponding enclosure and/or having one or more corresponding cooling devices. For example, each cryptographic hardware asset 108 can include one or more integrated circuits in a respective computer case or chassis. In some cases, each cryptographic hardware asset 108 can be referred to as a "miner."

The cryptographic hardware assets 108 can be configured to perform cryptographic mining operations, e.g., a blockchain mining process. For example, the cryptographic hardware assets 108 can be deployed as computational nodes in a cryptomining computer network for applications that rely on blockchain mining, e.g., for cryptocurrency mining, maintaining linked records of digital transactions, etc. In this context, a blockchain is a decentralized and distributed digital ledger that records units of information, e.g., transactions, across multiple computers or nodes. In a blockchain, transactions are grouped into blocks and added to a chain of previous blocks, forming a chronological sequence. Each block includes a hash value and a reference to the previous block, creating a linked structure. The blocks in the same blockchain are linked by having their hash values inserted into a designated field, e.g., a block header, in the next sequential block in the blockchain. A process of blockchain mining is designed to allow a blockchain system to reach a consensus in which all computational nodes in the blockchain system agree to a same blockchain. An example of a mining process by a computational node of a blockchain system can include computing (e.g., based on hash calculations) a valid proof-of-work for a block candidate that will be added to a blockchain. Based on the proof-of-work, cryptocurrency can be assigned to one or more wallets associated with the cryptographic hardware assets 108. The cryptographic hardware assets 108 can be configured to perform mining operations for one or more cryptocurrencies, e.g., Bitcoin, Ether, Monero, Litecoin, and/or other cryptocurrencies.

The network management system 102 can be (though need not be) remote from one or more of the sets 106 of cryptographic hardware assets, and can be communicatively coupled to the sets 106 by one or more networks, such as the Internet and/or internal system networks, e.g., one or more local area networks (LAN). The network management system 102 can use the one or more networks to send data to the cryptographic hardware assets 108 to control the cryptographic hardware assets 108, and can receive data (such as hardware parameters) from the cryptographic hardware assets 108 through the one or more networks.

Figure 3:
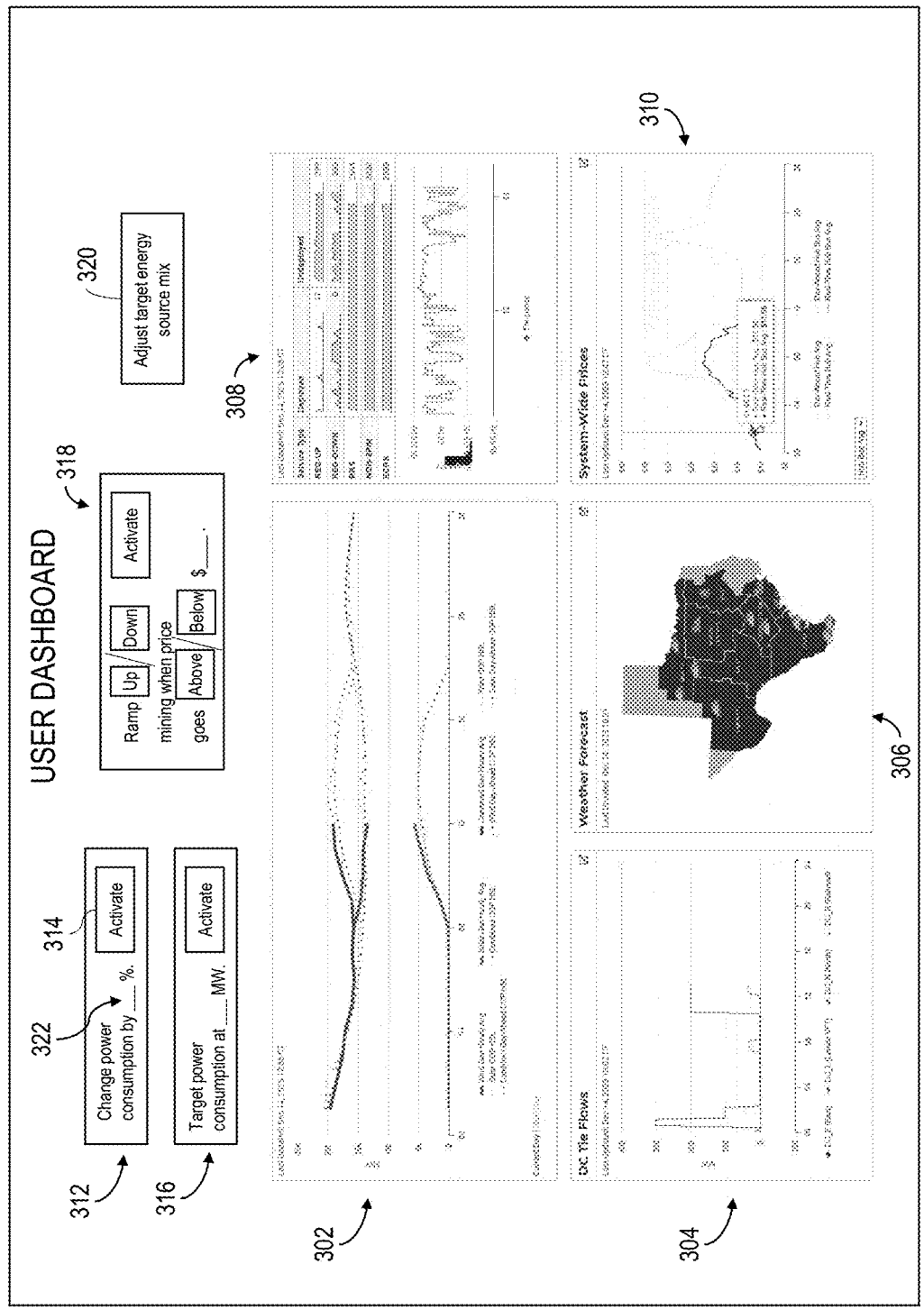
FIG. 3 illustrates an example of a user interface.

The system 100 further includes a user device 104. The user device 104 can be configured to present a user interface that communicates with the network management system 102 via an application programming interface (API). For example, the user interface can provide real-time data to help users make decisions regarding mining configurations, and can provide user controls that allow users to input aggregate operational parameters for the cryptographic hardware assets 108. An example of such a user interface is shown in FIG. 3. The user device 104 can include any interactive computer device, such as a smartphone, a desktop computer, a laptop computer, a tablet, a virtual reality (VR) and/or augmented reality (AR) device, a wearable device, etc. In some implementations, the user interface is provided at the user device 104 from the network management system 102, e.g., by servers of the network management system. For example, the user device 104 can access a webpage or application to be provided with the user interface by the network management system 102.

Figure 2:
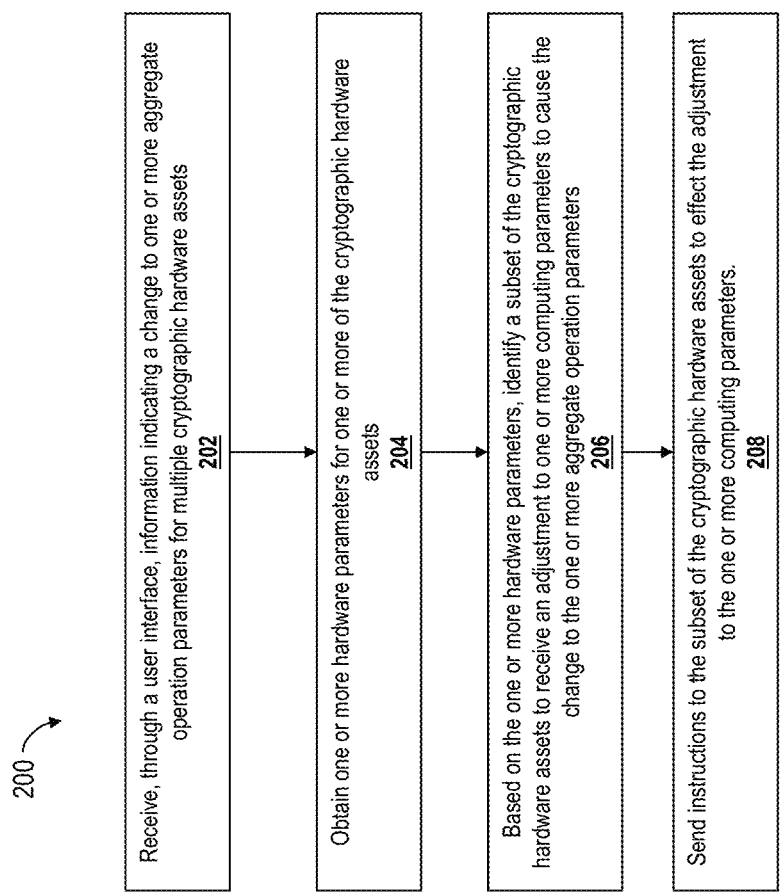
FIG. 2 is a diagram illustrating an example of a cryptomining adjustment process.

Referring to FIG. 2, in some implementations, the network management system 102 can be configured to perform a process 200 for differential control of cryptographic hardware assets. The process 200 includes receiving, through a user interface, information indicating a change to one or more aggregate operational parameters for multiple cryptographic hardware assets (202). For example, the user interface can be a user interface presented by the user device 104, and the multiple cryptographic hardware assets can be any two or more of the cryptographic hardware assets 108, such as all the cryptographic hardware assets 108. The multiple cryptographic hardware assets 108 can include multiple cryptographic hardware assets at a common facility/location (e.g., cryptographic hardware assets 108a and 108b) and/or multiple cryptographic hardware assets at multiple facilities/locations (e.g., cryptographic hardware assets 108a and 108c). The information can be received at the network management system 102 from the user device 104. In some implementations, the multiple cryptographic hardware assets 108 are cryptographic hardware assets 108 that are registered to, leased to, or otherwise assigned to a particular user or entity, and may be a subset of all cryptographic hardware assets 108 available for control by the network management system 102.

The aggregate operational parameters are overall parameters for the multiple cryptographic hardware assets 108, representing aggregate, combined operation. For example, the aggregate operational parameters can include aggregate power consumption by the multiple cryptographic hardware assets 108, and/or an aggregate hash rate or mining rate of the multiple cryptographic hardware assets (e.g., in TH/s). While the aggregate operational parameters are a result of the individual operation of each cryptographic hardware asset 108, the aggregate operational parameters are combined descriptors that, in and of themselves, indicate little about the configuration and operation of any individual cryptographic hardware asset 108. This level of abstraction can be helpful for promoting efficient cryptomining management, as users generally are most interested in aggregate operations (e.g., in relation to energy and cryptocurrency markets), as opposed to the particular configuration of any individual cryptographic hardware asset. Other examples of aggregate operational parameters include energy source usage and/or an energy source mix (e.g., a proportion or amount of power drawn from one or more types of energy source, such as wind, solar, renewable, natural gas, etc.); a distribution of power consumption across a grid (e.g., for load-balancing, as discussed further below); a utilization proportion (a proportion of cryptographic hardware assets that are mining, out of all available cryptographic hardware assets, e.g., all cryptographic hardware assets available to a user); and a number of cryptographic hardware assets that are mining.

For example, the user interface 300 shown in FIG. 3 can be used to input the change to the one or more aggregate operational parameters. As shown in FIG. 3, the user interface 300 is a dashboard that displays relevant information to a user and accepts user input. This non-limiting example of a dashboard provides information relating to Texas to facilitate control of a network of cryptographic hardware assets distributed across Texas. In some implementations, as in this example, the user interface 300 includes one or more graphics, plots, maps, and/or charts that display information relevant to user decision-making. In the user interface 300, chart 302 illustrates past and predicted power generation (e.g., in a given geographic region, such as a state), including energy sources. Chart 304 illustrates power transfer between power systems (in this case, transfer on non-synchronous transmission interconnections between Electric Reliability Council of Texas (ERCOT) and non-ERCOT electric power systems). Chart 306 illustrates the weather for various regions across a geographic area. Chart 308 illustrates utilization of various electricity services, such as Responsive Reserve Service (RRS) and ERCOT Contingency Reserve Service (ECRS); and chart 310 illustrates past and predicted electricity prices. These are non-limiting examples of types of data that can be displayed in the user interface 300. Other non-limiting examples of such data include cryptocurrency prices, data relating to the managed cryptographic hardware assets (e.g., any one or more aggregate operational parameters, information on system health, etc.), and news alerts that may be relevant to cryptographic hardware asset management. The data presented in the user interface 300 are examples of macroscopic variables based on which network management system 102 can control the cryptographic hardware assets 108, as discussed in further detail below.

The user interface 300 further includes interface elements with which a user can interact to input the change to the one or more aggregate operational parameters. In this example, element 312 can be used to adjust an aggregate power consumption by a configurable percentage (e.g., using an entry field 322 and a selectable icon 314); element 316 can be used to set a target power consumption (and/or, for example, a maximum power consumption); element 318 can be used to increase or decrease an aggregate mining rate in response to a cryptocurrency price or an energy price going above or below a configurable threshold; and element 320 can be selected to open a menu by which a user can adjust a target energy source mix.

As evinced by the examples of interface elements shown in FIG. 3, the change to the aggregate operational parameters can take various forms. In some cases, the change is a change to a target, maximum, or minimum value of the aggregate operational parameter, e.g., a target, maximum, or minimum power consumption, a target, maximum, or minimum mining rate, or a target energy mix or energy mix range. In some cases, the change is a proportional change, e.g., a change to increase or decrease an aggregate operational parameter by a certain percent. In some cases, the change sets a limit on the aggregate operational parameter, e.g., a maximum power consumption. In some cases, the change is conditional, e.g., a change that takes effect when one or more conditions (e.g., cryptocurrency price and/or energy price conditions) are met. In some implementations, the one or more conditions include weather-based conditions (e.g., to adjust an aggregate operational parameter in response to a temperature condition, a storm condition, etc.); event-based conditions (e.g., to adjust an aggregate operational parameter in response to a geopolitical event); and/or other market-based conditions, such as linking aggregate operational parameters to values of security prices, commodity prices, etc. In some implementations, the change is associated with a configurable time period over which the change is to be implemented, e.g., to curtail power consumption by x % over t minutes or to curtail the power consumption immediately. For example, the time period can be configured using a user interface element. Accordingly, users can configure complex energy-trading and mining strategies.

In some implementations, the change to the aggregate operational parameters can be set to override another strategy/objective, e.g., in a conditional manner. For example, during default operation, the network management system 102 can control the cryptographic hardware assets 108 according to a default strategy, e.g., to maximize profit. When a condition is satisfied, the network management system 102 can switch to an operation mode in which the change to the aggregate operational parameters is implemented, e.g., in response to certain condition(s) of the energy grid, cryptocurrency price, etc.

In some cases, the user interface is configured to receive a change to a mining strategy, and the change to the mining strategy is converted (e.g., by the network management system 102) into a corresponding change to one or more aggregate operational parameters. For example, the strategy can correspond to (i) a target load (e.g., power consumed as a function of time, or a maximum power consumption), (ii) a power trading plan, and/or (iii) a load distribution. Based on the strategy, a user can tune down power consumption and sell excess power, or increase power consumption and benefit (at the margin) from consuming more power, e.g., when the grid has excess capacity. The strategy is enacted by changing one or more aggregate operational parameters in accordance with the strategy.

For example, in some implementations, the strategy corresponds to a load distribution for consumption of power by the cryptographic hardware assets 108. The load distribution is distinct from, though sometimes related to, aggregate power consumption by the cryptographic hardware assets

108: even when the aggregate power consumption remains constant, the load distribution may be changed by distributing the power consumption differently across the cryptographic hardware assets 108. Accordingly, in some implementations the network management system 102 is configured to adjust the computing parameters of the subset of the cryptographic hardware assets 108 in order to adjust the load distribution. The load distribution can be adjusted based on the macroscopic variables, for example, to perform load balancing (e.g., consuming more/less power in geographic regions where power is more/less plentiful and/or less/more expensive), based on weather (e.g., performing more/less mining where temperatures are lower/higher, to case cooling requirements), etc.

In some implementations, the change to the one or more aggregate operational parameters is provided with respect to a group of cryptographic hardware assets. For example, a user can select the group and input the change specific to the group, e.g., "reduce power consumption by [a selected group of cryptographic hardware assets] by 10%." Different strategies, constraints, conditions, and changes to aggregate operational parameters can be assigned to different groups of cryptographic hardware assets 108. In some implementations, the user interface provides an option by which a user can configure the change to apply to all cryptographic hardware assets 108 assigned to the user.

Referring again to FIG. 2, the process 200 includes obtaining one or more hardware parameters for one or more of the cryptographic hardware assets (204). For example, the network management system 102 can receive hardware parameters for one or more of the cryptographic hardware assets 108, e.g., as data transmitted through one or more networks. The hardware parameters can characterize the operations of the cryptographic hardware assets 108 at an individual asset level (e.g., as opposed to aggregate characterizations). Examples of hardware parameters include power consumption, hash rate, hash efficiency (e.g., hash rate/power consumption), and temperature (e.g., an internal chip temperature). In some implementations, the network management system 102 receives power consumption data as output by, and/or based on data obtained from, power supply units (PSUs) of the cryptographic hardware assets 108, providing asset-level power consumption information that may not be accessible in more software-focused approaches.

Although FIG. 1 illustrates the hardware parameters being obtained from each set 106 for clarity, in some implementations, the network management system 102 can obtain hardware parameters from only some of the cryptographic hardware assets 108, e.g., for one or more of the sets 106 of cryptographic hardware assets 106.

In some implementations, one or more of the hardware parameters (e.g., any of the hardware parameters described herein) are obtained in real time as real-time hardware parameters. "Real time," as used herein, indicates effectively up-to-date data reflecting current or effectively-current states of the cryptographic hardware assets 108. For example, real-time hardware parameters can be provided to the network management system 102 as a stream of data, and the network management system 102 can access the stream to obtain the real-time hardware parameters. As another example, the network management system 102 can query the cryptographic hardware assets 108, and the cryptographic hardware assets 108 can, in response to the query, perform an operation to obtain up-to-date values of the real-time hardware parameters, e.g., by querying a sensor (e.g., a power sensor or temperature sensor) that provides the values, executing a function to calculate the values based on current data (e.g., calculating a hash efficiency based on a current hash rate and a current power consumption), etc. The obtained real-time values can then be sent to the network management system 102 as a response to the query.

The process 200 further includes, based on the hardware parameters, identifying a subset of the cryptographic hardware assets to receive an adjustment to one or more computing parameters, to cause the change to the one or more aggregate operational parameters (206). The process 200 further includes sending instructions to the subset of the cryptographic hardware assets to effect the adjustment to the one or more computing parameters (208). For example, the network management system 102 can send signals to the subset of the cryptographic hardware assets 108 to cause the adjustment. Operation 206 can include determining the adjustment to the one or more computing parameters based on the hardware parameters, macroscopic variables, and/or other data as discussed below.

Although FIG. 1, for clarity, shows the instructions being sent generally from the network management system 102 to the cryptographic hardware assets 108, in some implementations, the instructions are sent in a targeted manner, e.g., only to the subset of the cryptographic hardware assets 108 and/or only to sets 106 having cryptographic hardware asset(s) included in the subset. Different instructions can be sent to different subsets of the cryptographic hardware assets 108 to cause different adjustments to the different subsets.

While the information received through the user interface at the network management system 102 defines an aggregate change to operation of the cryptographic hardware assets, that aggregate change can be actualized in many different ways. As a basic example, if the change to the aggregate operational parameter is to reduce power consumption by 10%, then two operations to effect that change may be to shut down 10% of the cryptographic hardware assets, or to reduce the power consumption of each cryptographic hardware asset by 10%. The network management system 102 selects between these two operations and many other possible operations that would effect the change, choosing the adjustment that best satisfies one or more objectives and/or constraints. These objectives and constraints are discussed in further detail below.

A "subset" of the cryptographic hardware assets is identified to receive the adjustment to the one or more computing parameters, where the subset is a strict subset, e.g., fewer than all of the cryptographic hardware assets available for control.

For example, a first subset of the cryptographic hardware assets can receive the adjustment, and a second, different subset can receive no adjustments. As another example, the first subset can receive the adjustment, and a second, different subset can receive a different adjustment. Accordingly, the cryptographic hardware assets are adjusted differentially. The subset can include, for example, cryptographic hardware assets 108 from each of multiple sets 106 at multiple corresponding locations and/or associated with multiple different entities (e.g., assets 108*a* and 108*c*), an entire set 106 of cryptographic hardware assets 108 at a single location and/or associated with a single entity (e.g., all assets in set 106*a*), or a portion of the cryptographic hardware assets 108 from a set of cryptographic hardware assets 108 at a single location and/or associated with a single entity (e.g., only assets 108*a*, 108*b* from among additional assets in set 106*a*).

In some implementations, the subset is a subset of all cryptographic hardware assets associated with (e.g., available for control by) the user or entity instructing the change to the aggregate operational parameters. In some implementations, the subset is a subset of all cryptographic hardware assets available for control by the network management system 102, and may include at least one cryptographic hardware asset that is not associated with the user or entity instructing the change to the aggregate operational parameters. The latter case is discussed below in reference to "global management."

The hardware-integrated nature of the network management system 102—e.g., in obtaining hardware parameters and adjusting computing parameters—can provide significant benefits to subset identification and cryptographic hardware asset adjustment. First, because the network management system 102 has access to hardware parameters, the network management system 102 can both better identify the subset and better determine the adjustment, e.g., to better satisfy objectives and/or constraints. This is because, in practice, each cryptographic hardware asset 108 may differ from other cryptographic hardware assets 108, even when the assets are ostensibly the same (e.g., the same asset model, having the same internal hardware, etc.). For example, the so-called "silicon lottery" may result in different chips of the same model having different clocking capabilities. As another example, the capabilities and/or characteristics of a cryptographic hardware asset may depend on the past usage of that cryptographic hardware asset, e.g., based on thermal degradation over time. As a further example, different cryptographic hardware assets 108 may operate differently based on different locations of the cryptographic hardware assets 108 in a facility, e.g., based on positioning relative to cooling systems, outer walls, other cryptographic hardware assets 108, etc. Software-focused cryptomining management schemes, without access to hardware parameters, may lack awareness of these asset-to-asset differences and/or rely on information which may be out-of-date. However, the hardware parameters accessible to the network management system 102 can expose asset-to-asset differences and allow the network management system 102 to make appropriate determinations based on the differences. In implementations in which the hardware parameters are real-time hardware parameters, the determinations can be made based on current data for enhanced accuracy and effectiveness.

Moreover, in some implementations, the computing parameters adjusted by the network management system 102 are low-level computing parameters, permitting fine adjustments that may not be possible for cryptomining management schemes that operate at a software-only level. For example, the computing parameters can include at least one of a clock frequency or a supply voltage. Adjustment of one or both of these parameters can allow the network management system 102 to effect changes to aggregate operational parameters by fine adjustment of cryptographic hardware assets, e.g., instead of being limited to switching cryptographic hardware assets on and off in a binary manner. For example, the clock frequency and/or supply voltage can be adjusted from a first value to a second value, where both the first value and the second correspond to an enabled, hashing cryptographic hardware asset. In some implementations, the adjustment can be performed without rebooting the subset of cryptographic hardware assets 108, increasing an amount of hashing performed (e.g., by reducing downtime compared to a process that incorporates a reboot) and, in some cases, reducing asset failures associated with power cycling.

The supply voltage can be a supply voltage provided to a computer chip of a cryptographic hardware asset 108, and the clock frequency (sometimes referred to as an operation frequency) can correspond to a frequency of a clock signal generated by the computer chip. A reduction of one or both of these computing parameters can decrease power consumed by the cryptographic hardware asset 108, heat generated by the cryptographic hardware asset 108, and a computation speed (e.g., hash rate) of the cryptographic hardware asset 108, while an increase can have the opposite effect. In some implementations, the supply voltage and/or clock frequency can be adjusted (in operation 208) as described in U.S. patent application Ser. No. 18/239,977, the entirety of which is incorporated herein by reference. For example, the adjustment can be performed using signals as described with respect to FIG. 2 of U.S. patent application Ser. No. 18/239,977.

Other examples of computing parameters that can be adjusted by the network management system 102 include a number of computing cores of a cryptographic hardware asset that are used for hash operations and a hash rate of a cryptographic hardware asset.

As an example of fine, differential control of cryptographic hardware assets, a first cryptographic hardware asset may draw 5000 W of power at a mining rate of 180 TH/s, and a second cryptographic hardware asset may draw 4900 W at the mining rate of 180 TH/s. A command to curtail both cryptographic hardware assets by 10% would mean that the power consumed would drop by 990 W. Instead of dropping power consumption of each cryptographic hardware asset by 495 W, it may be preferable to reduce power consumption by the first cryptographic hardware asset by 550 W and reduce power consumption by the second cryptographic hardware asset by 440 W. This configuration can provide improved efficiency of mining from both cryptographic hardware assets.

In some implementations, the network management system 102 identifies the subset of the cryptographic hardware assets 108 to receive the adjustment to the one or more computing parameters based on one or more additional asset-level parameters of the cryptographic hardware assets 108, which need not be hardware parameters. These asset-level parameters can include, but are not limited, models of the cryptographic hardware assets 108; different configurations of the cryptographic hardware assets 108; locations of the cryptographic hardware assets 108 in a given facility and/or across facilities; firmware of the cryptographic hardware assets 108; and ambient temperature in proximity to the cryptographic hardware assets 108.

As noted above, the network management system 102 can determine one or more adjustments to the subset of cryptographic hardware assets 108 to achieve one or more objectives and/or subject to one or more constraints. Examples of constraints include, for example, a maximum/minimum power consumption; a maximum/minimum hash rate; a maximum/minimum number of cryptographic hardware assets 108 to be used for hashing; a maximum/minimum ramp rate for power consumption and/or hash rate; a range of energy source mixes within which the cryptographic hardware assets 108 should be operated; a range of computing parameters within which one or more cryptographic hardware assets 108 are to be operated (e.g., to maintain target heat levels for the cryptographic hardware assets); and contract(s) that may govern usage of power and/or of the cryptographic hardware assets 108 (e.g., a fee structure according to which the cryptographic hardware assets are being utilized). Moreover, the change to the one or more aggregate operational parameters can itself be interpreted as a constraint, because the network management system 102 determines the subset of cryptographic hardware assets 108 and the adjustment to the computing parameters subject to effecting the change. The constraints can be received through the user interface (e.g., input with the change to the aggregate operational parameters) or otherwise obtained. The constraints can correspond to an overall mining strategy of a user or entity.

The objectives can include one or more parameters to maximize or minimize, alone or in combination, in conjunction with the change to the aggregate operational parameters. For example, in some implementations, the network management system 102 is configured to determine the adjustment to the computing parameters such that the change to the one or more aggregate operational parameters is executed while maximizing profit (e.g., the value of mined cryptocurrency, minus the value of energy used to mine the cryptocurrency), e.g., at a certain time or over a defined duration of time. For example, multiple different subsets of cryptographic hardware assets 108 receiving the adjustments, and/or different adjustments being made, may each provide the instructed change in aggregate operational parameters while differing from one another in power consumption, hash rate, profit, energy source mix, etc. Accordingly, the network management system 102 can select a combination of the subset and the adjusted computing parameters that best satisfies the objective(s). Examples of objectives that the network management system 102 can attempt to satisfy (e.g., maximize or minimize) when identifying the subset and determining the adjustment to the computing parameters include, in addition to profit, any of the aggregate operational parameters discussed above.

For example, some operations by the network management system 102 include determining a strategy for resolving a constrained optimization problem. Increased mining levels provide increased amounts of mined cryptocurrency along with increased power consumption and, correspondingly, higher financial expenditure on electricity. The network management system 102 can be configured to determine, as the strategy, the subset of cryptographic hardware assets 108 and the adjustment to the computing parameters to implement the change to the aggregate operational parameters, in a manner that balances mining levels and power consumption to maximize (optimize) the profit gained by mining, and in a manner that adheres to any constraints imposed by users. Because the network management system 102 (i) has access to hardware parameters and (ii) can adjust computing parameters of a subset of cryptographic hardware assets 108, the constrained optimization problem can be solved to obtain higher profit, with lower energy consumption, than might be possible if, for example, the network management system 102 did not have access to hardware parameters, could not make fine adjustments to computing parameters, and/or could not adjust cryptographic hardware assets differentially on a subset-by-subset basis.

Moreover, the use of hardware parameters and adjustment of computing parameters of a subset of cryptographic hardware assets can, in some implementations, decrease aggregate energy consumption and/or increase aggregate computational efficiency of the cryptographic hardware assets. For a given mining rate, power consumption can be decreased, and, for a given level of power consumption, computational resources can be utilized more efficiently. Accordingly, implementations according to this disclosure can provide improvements to the aggregated functioning of the cryptographic hardware assets based on improved, hardware-aware and/or computation-adjusting asset management.

The network management system 102 can use one or more suitable optimization methods. Such methods can include—but are not limited to—gradient methods, randomized search methods, genetic algorithm methods, and stochastic methods. In some implementations, the network management system 102 executes one or more trained machine learning models, where the models have been trained to receive, as input, changes to aggregate operational parameters, hardware parameters, and, in some implementations, additional data (e.g., macroscopic variables, other asset-level data, etc.) and to output the subset of the cryptographic hardware assets 108 that is to be adjusted and the adjustments to the computing parameters to be performed. For example, in some implementations the models are trained using, as training data, past and/or simulated data (e.g., hardware parameters) of cryptographic hardware assets and their corresponding computing parameters, and, as labels for the training data, corresponding hash rates and power consumption. The machine learning models can any one or more types of machine learning model, such as neural networks, large language models, etc. However, other training methods and optimization methods are also within the scope of this disclosure.

In some implementations, as shown in FIG. 1, the network management system 102 receives macroscopic variables based on which the network management system 102 can make determinations, e.g., identifying the subset of the cryptographic hardware assets and determining the adjustments to the subset. The macroscopic variables can include data provided in the user interface, such as user interface 300, e.g., cryptocurrency prices, energy prices, weather information (e.g., temperature and/or storm information), energy grid information, commodity prices, market events, other market information, etc. In some implementations, the macroscopic variables include one or more variables corresponding to conditions, discussed above. For example, the change to the aggregate operational parameters can be conditional on one or more of the macroscopic variables having one or more values. The macroscopic variables can be received at the network management system 102 from one or more sources over a network. The sources can include, for example, one or more external platforms, such as news platforms, finance platforms, weather platforms, energy platforms, etc. Identifying the subset of the cryptographic hardware assets to receive the adjustment to one or more computing parameters, to cause the change to the one or more aggregate operational parameters (206) can be based on the macroscopic variables.

For example, in some implementations, the network management system is configured to access APIs associated with utility providers and/or energy traders/pricers (e.g., qualified scheduling entities (QSEs)) to obtain real-time energy prices, as an example of a macroscopic variable.

Figure 4:
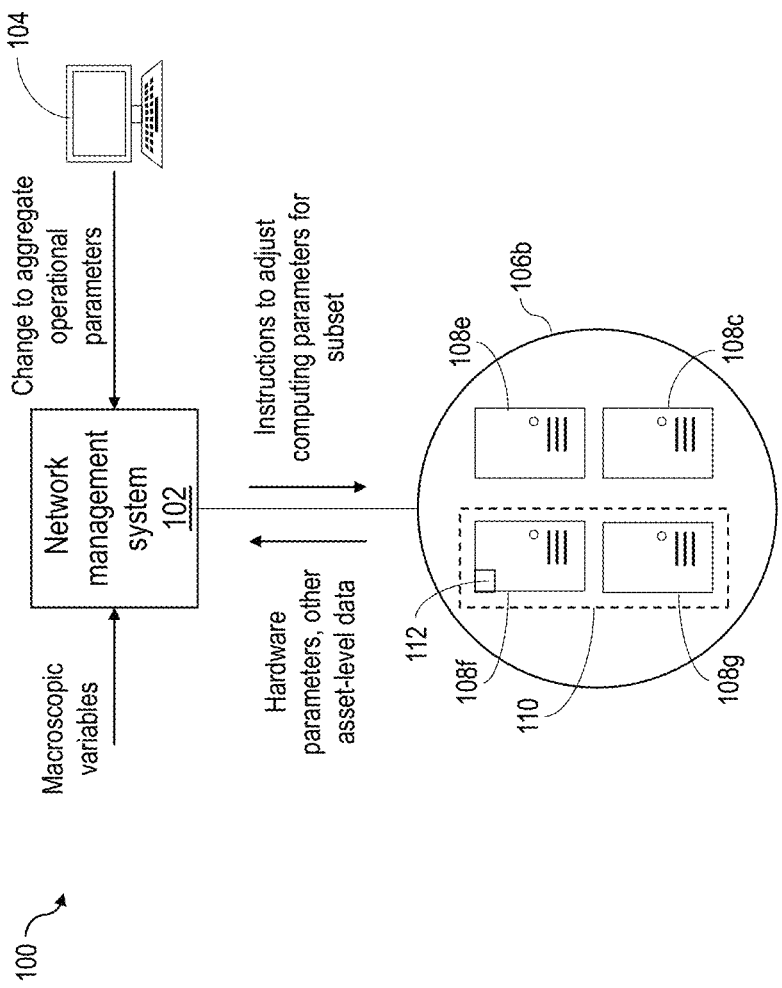
FIG. 4 is a diagram illustrating an example of a cryptomining system.

FIG. 4 illustrates the system 100 with a focus on an identified subset 110 of cryptographic hardware assets 108. In this example, the subset 110 is a subset of the cryptographic hardware assets 108 in the set 106b. In the example of FIG. 4, the cryptographic hardware assets 108 in the set 106b are co-located with one another. Cryptographic hardware assets 108f, 108g are included in the subset 110 and are, accordingly, controlled by the network management system 102 to cause an adjustment in computing parameters of the cryptographic hardware assets 108f, 108g. Cryptographic hardware assets 108c, 108e are not included in the 110 and, accordingly, are not controlled to receive the adjustment. The cryptographic hardware assets 108c, 108e may be controlled to receive another, different adjustment to effect the change to the aggregate operational parameters, or may receive no adjustments. As discussed above, the cryptographic hardware assets 108f, 108g may be identified for inclusion in the subset 110 based on hardware parameters of the cryptographic hardware assets 108f, 108g, allowing for the network management system 102 to effect the change to the aggregate operational parameters in the most efficient manner.

In some implementations, the hardware parameters of the cryptographic hardware assets 108c, 108c, 108f, 108g can reflect differences in location/positioning of the cryptographic hardware assets 108c, 108c, 108f, 108g in a common facility of the set 106b of cryptographic hardware assets. For example, cryptographic hardware assets closer to a cooling system and/or further from an exterior of the facility may exhibit lower temperatures and/or lower power consumption (e.g., for a given hash rate) than cryptographic hardware assets further from the cooling system and/or closer to the exterior. Accordingly, based on the use of hardware parameters, the subset 110 can correspond to cryptographic hardware assets having particular locations/positioning. This example illustrates the subtlety of the differential control that can be provided by hardware-integrated cryptographic hardware asset control, to ultimately provide improved computational/power efficiencies and better achievement of objectives.

Also illustrated in FIG. 4 is an internal sensor 112 of cryptographic hardware asset 108f. The internal sensor 112 can be, for example, a temperature sensor (e.g., to measure an internal chip temperature), a power sensor (e.g., a sensor in a PSU of the cryptographic hardware asset 108f and configured to output, in real-time, the power consumed by the cryptographic hardware asset 108f), or a processing-related sensor (e.g., outputting a hash rate of the cryptographic hardware asset 108f, a clock frequency, etc.). The network management system 102 can receive the output of the internal sensor 112 and internal sensors of other cryptographic hardware assets 108 to perform hardware-aware differential control of the cryptographic hardware assets 108.

In some implementations, the network management system 102 is configured to perform "global management," in which cryptographic hardware assets 108 assigned to multiple users/entities are adjusted. For example, referring to FIG. 1, the set 106a may be a set of cryptographic hardware assets 108 assigned to a first user or entity (and may be distributed across one or more locations). The first user or entity can instruct a change to aggregate operational parameters of the cryptographic hardware assets 108 in the set 106a. In response, the network management system 102 can adjust computing parameters of not only computing parameters of one or more cryptographic hardware assets 108 in the set 106a (e.g., cryptographic hardware asset 108a), but can also (though need not) adjust computing parameters of one or more cryptographic hardware assets 108 in sets 106b and/or 106c (e.g., cryptographic hardware asset 108c). This configuration can provide overall increased cost and/or computational efficiency by allowing the network management system 102 to compensate for and/or respond to changes instructed by users. For example, if the first user inputs that the set 106a should increase its aggregate mining rate, the network management system 102 can redistribute mining/power consumption by sets 106b and/or 106c to, for example, respond to anticipated energy price changes induced by the increased aggregate mining rate of the set 106a, case cooling needs in view of the increased aggregate mining rate of the set 106a, etc.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the crypto-mining system 100 (e.g., the cryptographic hardware asset(s) 108, user device 104, network management system 102, etc.) can be implemented using digital electronic circuitry, or in computer software, firmware, or hardware, or in combinations of one or more of them. As another example, the process 200 shown in FIG. 2 can be implemented using digital electronic circuitry, or in computer software, firmware, or hardware, or in combinations of one or more of them.

Figure 6:
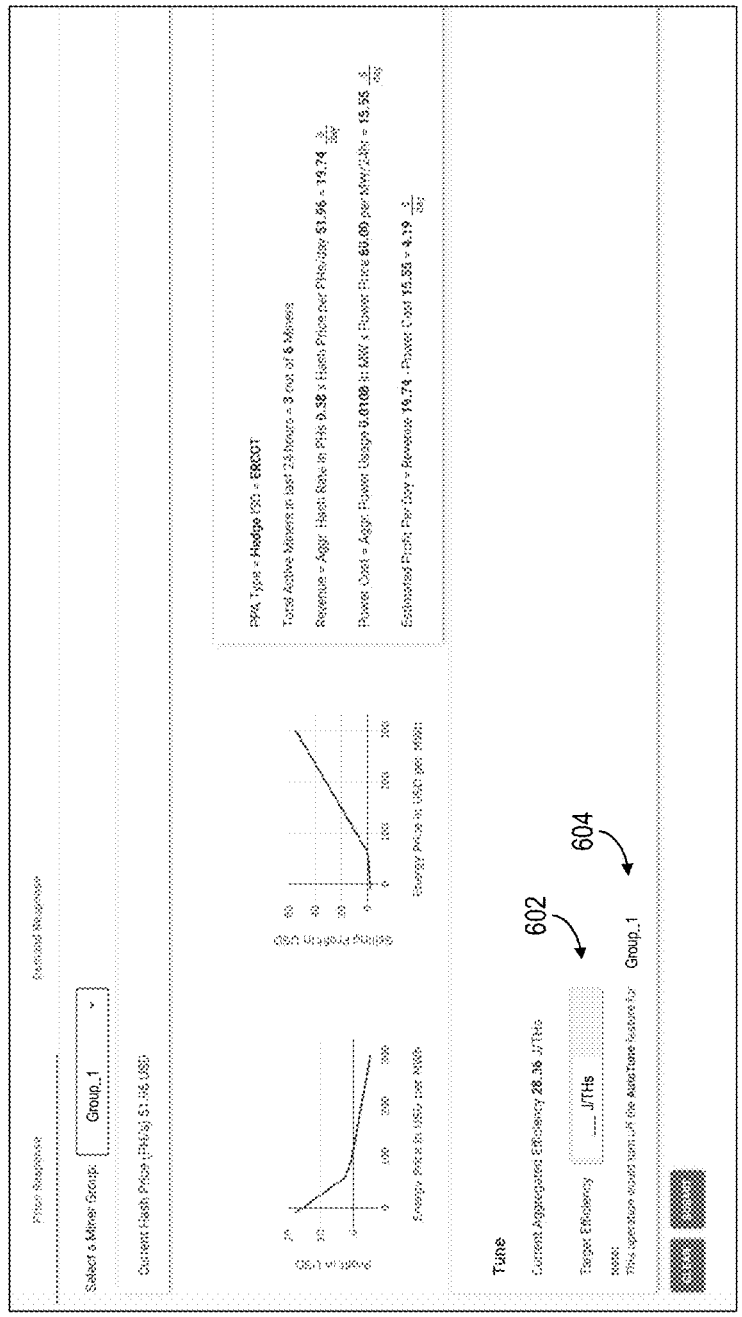
FIGS. 6-8 illustrate examples of user interfaces.

FIG. 6 illustrates another example of a user interface 600 that can be presented on a user device 104, e.g., by the network management system 102. The user interface 600 illustrates examples of control methods that can be used to adjust computing parameters of cryptographic hardware assets. As shown in FIG. 6, in some implementations, the cryptographic hardware assets (e.g., "miners" in the terminology of the user interface 600) can be grouped into groups, and settings can be applied on a group-by-group basis. In this example, an interface element 602 is usable to set a target efficiency for the group "Group_1." The target efficiency is an example of a change to aggregate operational parameters. Further, the network management system 102 tracks real-time hash price and calculates real-time profit as a function of real-time energy price. A notification 604 illustrates a feature (optionally included in some implementations) in which configuring a particular aggregate operational parameter may override other configurations of aggregate operational parameters. For example, setting the target efficiency may override previous settings ("AutoTune") related specifically to cryptocurrency prices, for example.

Figure 7:
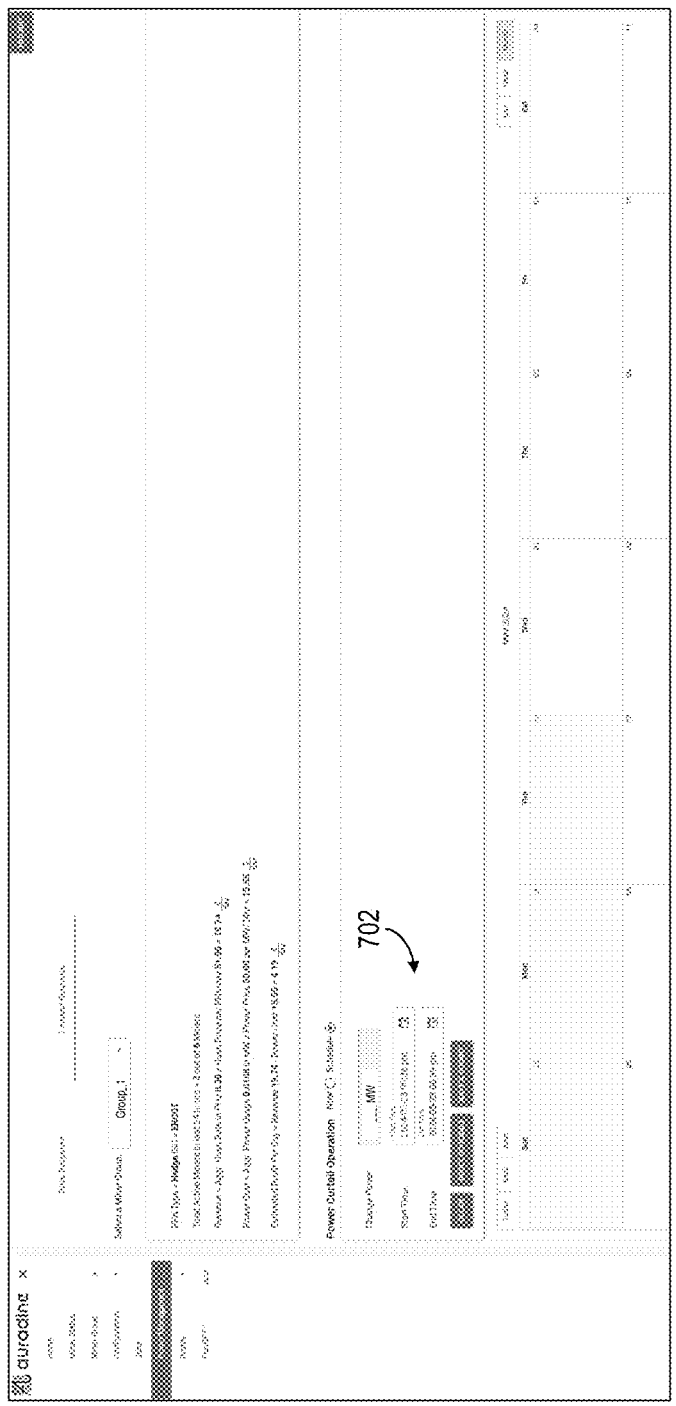

FIG. 7 illustrates another example of a user interface 700 that can be presented on a user device 104, e.g., by the network management system 102. The user interface 700 illustrates examples of control methods that can be used to adjust computing parameters of cryptographic hardware assets. As shown in FIG. 7, in some implementations, a "power curtail operation" can be configured to a group of cryptographic hardware assets. Interface elements 702 are usable to set (e.g., immediately or for a scheduled future time) a change (e.g., increase or decrease) in power consumption for the group of cryptographic hardware assets. The change in power consumption can be an absolute change or a percentage change. In some implementations, the change is an upper limit, e.g., "consume no more than _ MW." "Start Time" and "End Time" controls can be used to set a time duration of the power ramp up or ramp down, e.g., the input change in power is effected over a time duration between the start and end times, e.g., over 20 minutes. In some cases, this can provide improved computational and/or profit results compared to modifying load instantly. The change in power is an example of a change to aggregate operational parameters.

Figure 8:
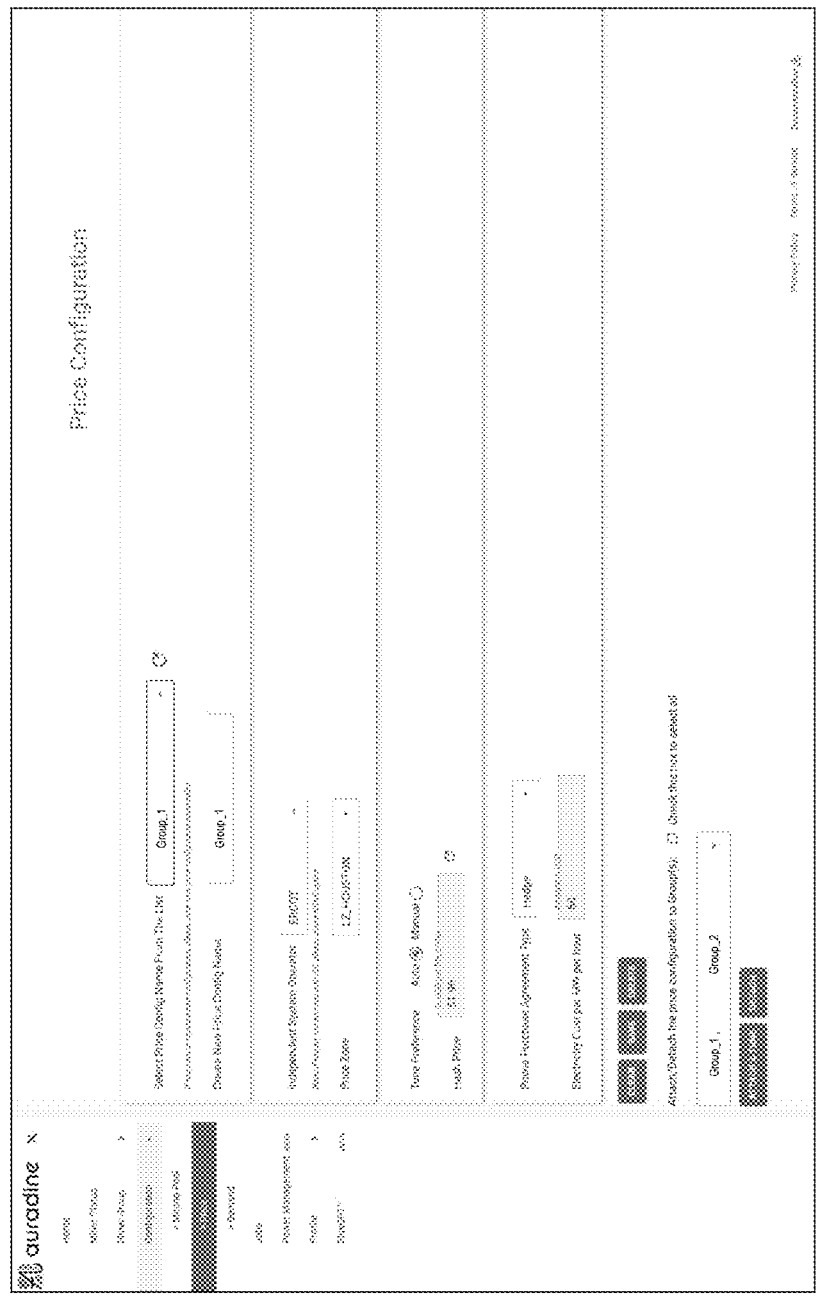

FIG. 8 illustrates another example of a user interface 800 that can be presented on a user device 104, e.g., by the network management system 102. The user interface 800 illustrates examples of control methods that can be used to adjust computing parameters of cryptographic hardware assets. As shown in FIG. 8, in some implementations, the network management system 102 can adjust the computing parameters based on a power purchase agreement, such as a "hedge" agreement. The hedge agreement sets a predetermined energy price (in this example $60 per MW per hour) to be paid for operation of cryptographic hardware assets. The network management system 102 can control cryptographic hardware assets based on the predetermined energy price. For example, in some cases, rather than using a real-time market energy price as a macroscopic variable, the network management system 102 can use the predetermined energy price. As shown in FIG. 8, the power purchase agreement can be applied on a group-by-group basis to the cryptographic hardware assets.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 5:
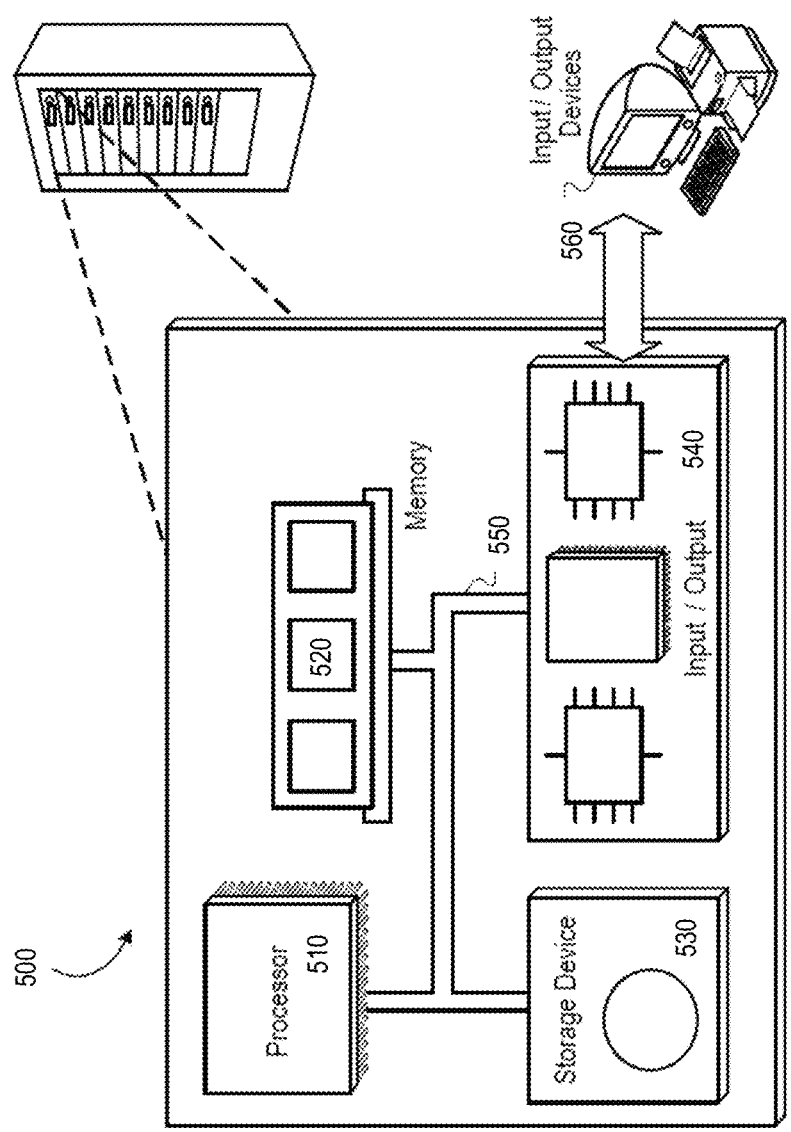
FIG. 5 is a diagram illustrating an example of a computer system.

FIG. 5 illustrates an example of a computer system 500 that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. In some implementations, the process 200, the cryptographic hardware assets 108, the user device 104, and/or the network management system 102 can be implemented using the processors 510 and/or using multiple such processors 510. The memory 520 and the storage device 530 can store information within the system 500.

The input/output device 540 provides input/output operations for the system 500. In some implementations, the input/output device 540 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method, comprising:
   receiving, through a user interface at a computer system, information indicating a target value for an aggregate operational parameter for a plurality of cryptographic hardware assets that are remote from the computer system and communicatively coupled to the computer system through one or more networks;
   obtaining one or more hardware parameters for one or more of the plurality of cryptographic hardware assets;
   in response to receiving the information indicating the target value, and based on the one or more hardware parameters, determining (i) a first adjustment to a computing parameter for a first cryptographic hardware asset of the plurality of cryptographic hardware assets, and (ii) a second adjustment to the computing parameter for a second cryptographic hardware asset of the plurality of cryptographic hardware assets, wherein the first adjustment is different from the second adjustment, and wherein the first adjustment and the second adjustment are configured to jointly cause the plurality of cryptographic hardware assets to achieve the target value for the aggregate operational parameter,
   wherein the aggregate operational parameter comprises an aggregate power consumption by the plurality of cryptographic hardware assets, or an aggregate computation rate of the plurality of cryptographic hardware assets; and
   sending instructions to effect the first adjustment and the second adjustment,
   wherein determining the first adjustment and the second adjustment comprises resolving a constrained optimization problem in which:
      the target value for the aggregate operational parameter is a constraint,
      an objective to be optimized comprises at least one of profit, the aggregate computation rate, or the aggregate power consumption, and
      the computing parameters for the first and second cryptographic hardware assets are differentially adjustable as part of optimization, and
   wherein the plurality of cryptographic hardware assets are controlled by a first entity, and a second plurality of cryptographic hardware assets are controlled by a second entity distinct from the first entity, and
   wherein the method comprises, in response to receiving the information indicating the target value, identifying a third cryptographic hardware asset included in the second plurality of cryptographic hardware assets.

2. The method of claim 1, wherein the computing parameter comprises a clock frequency or a supply voltage.

3. The method of claim 1, wherein the one or more hardware parameters comprise at least one of an internal chip temperature, a hash rate, a hash efficiency, or a power consumption.

4. The method of claim 1, wherein the one or more hardware parameters comprise real-time hardware parameters.

5. The method of claim 1, wherein sending the instructions to effect the first adjustment comprises:
   sending instructions to increase a hash rate of the first cryptographic hardware asset and increase power consumption by the first cryptographic hardware asset, or
   sending instructions to decrease the hash rate of the first cryptographic hardware asset and decrease the power consumption by the first cryptographic hardware asset.

6. The method of claim 1, wherein the first adjustment and the second adjustment are configured to jointly achieve a target energy source mix for the plurality of cryptographic hardware assets.

7. The method of claim 1, wherein the information indicating the target value for the aggregate operational parameter comprises an indication that the target value should be achieved in response to a condition being satisfied, and
   wherein sending the instructions is performed in response to determining that the condition is satisfied.

8. The method of claim 7, wherein the condition is based on at least one of an energy price or a cryptocurrency price.

9. The method of claim 1, comprising obtaining the one or more hardware parameters using internal sensors of the cryptographic hardware assets.

10. The method of claim 1, wherein sending the instructions comprises decreasing a computation rate of the first cryptographic hardware asset without disabling computation by the first cryptographic hardware asset.

11. The method of claim 1, comprising identifying the first and second cryptographic hardware assets to respectively receive the first and second adjustments based on ambient temperatures of the first and second cryptographic hardware assets.

12. The method of claim 1, wherein the plurality of cryptographic hardware assets are located at a common facility, and
   wherein the method comprises identifying the first and second cryptographic hardware assets to respectively receive the first and second adjustments based on locations of the first and second cryptographic hardware assets within the common facility.

13. The method of claim 1, wherein the first and second cryptographic hardware assets are located at different facilities from one another.

14. The method of claim 1,
wherein the method comprises:
performing a third adjustment of the computing parameter for the third cryptographic hardware asset.

15. The method of claim 14, wherein the third adjustment comprises a redistribution of computation or power consumption between the plurality of cryptographic hardware assets and the second plurality of cryptographic hardware assets.

16. The method of claim 14, comprising:
predicting a result of implementing the first and second adjustments; and
determining the third adjustment based on the predicted result.

17. The method of claim 16, wherein the predicted result comprises:
a predicted change in energy price upon performing the first and second adjustments, or
a predicted change in an amount of cooling need of at least one of the first cryptographic hardware asset or the second cryptographic hardware asset upon performing the first and second adjustments.

18. The method of claim 1, wherein the first and second adjustments are configured to cause load-balancing among the plurality of cryptographic hardware assets.

19. A system comprising:
a plurality of cryptographic hardware assets configured to perform hashing operations, wherein the plurality of cryptographic hardware assets are controlled by a first entity;
a second plurality of cryptographic hardware assets controlled by a second entity distinct from the first entity; and
a control system remote from the plurality of cryptographic hardware assets and communicatively coupled to the plurality of cryptographic hardware assets through one or more networks, wherein the control system is configured to perform operations comprising:
receiving, through a user interface, information indicating a target value for an aggregate operational parameter for the plurality of cryptographic hardware assets,
obtaining one or more hardware parameters for one or more of the plurality of cryptographic hardware assets,
in response to receiving the information indicating the target value, and based on the one or more hardware parameters, determining (i) a first adjustment to a computing parameter for a first cryptographic hardware asset of the plurality of cryptographic hardware assets and (ii) a second adjustment to the computing parameter for a second cryptographic hardware asset of the plurality of cryptographic hardware assets, wherein the first adjustment is different from the second adjustment, and wherein the first adjustment and the second adjustment are configured to jointly cause the plurality of cryptographic hardware assets to achieve the target value for the aggregate operational parameter,
wherein the aggregate operational parameter comprise an aggregate power consumption by the plurality of cryptographic hardware assets, or an aggregate computation rate of the plurality of cryptographic hardware assets, and
sending instructions to effect the first adjustment and the second adjustment,
wherein determining the first adjustment and the second adjustment comprises resolving a constrained optimization problem in which:
the target value for the aggregate operational parameter is a constraint,
an objective to be optimized comprises at least one of profit, the aggregate computation rate, or the aggregate power consumption, and
the computing parameters for the first and second cryptographic hardware assets are differentially adjustable as part of optimization, and
wherein the operations further comprise, in response to receiving the information indicating the target value, identifying a third cryptographic hardware asset included in the second plurality of cryptographic hardware assets.

20. The system of claim 19, wherein the operations comprise performing a third adjustment of the computing parameter for the third cryptographic hardware asset.

21. A method, comprising:
receiving, through a user interface at a computer system, information indicating a target value for aggregate power consumption or aggregate computation rate by a first plurality of cryptographic hardware assets that are remote from the computer system and communicatively coupled to the computer system through one or more networks,
wherein the first plurality of cryptographic hardware assets is assigned to be controlled by a first entity, and
wherein the computer system is further communicatively coupled to a second plurality of cryptographic hardware assets assigned to be controlled by a second entity, wherein the second entity is distinct from the first entity;
obtaining at least one of a real-time internal chip temperature or a real-time power consumption for each of a first cryptographic hardware asset of the first plurality of cryptographic hardware assets and a second cryptographic hardware asset of the first plurality of cryptographic hardware assets;
in response to receiving the information indicating the target value, and based on the at least one of the real-time internal chip temperature of the real-time power consumption, determining a first adjustment to at least one of clock frequency or supply voltage for the first cryptographic hardware asset and a second adjustment to at least one of clock frequency or supply voltage for the second cryptographic hardware asset, wherein the first adjustment and the second adjustment jointly cause the first plurality of cryptographic hardware assets to achieve the target value;
predicting a result of performing the first and second adjustments;
based on the predicted result, and in response to receiving the information indicating the target value, determining a third adjustment to at least one of clock frequency or supply voltage for a third cryptographic hardware asset of the second plurality of cryptographic hardware assets; and
sending instructions to the first cryptographic hardware asset, the second cryptographic hardware asset, and the third cryptographic hardware asset, wherein the instructions are configured to effect the first, second, and third adjustments, wherein determining the first adjustment and the second adjustment comprises resolving a constrained optimization problem in which:

the target value for the aggregate power consumption or the aggregate computation rate is a constraint, an objective to be optimized comprises at least one of profit, the aggregate computation rate, or the aggregate power consumption, and the at least one of clock frequency or supply voltage for the first and second cryptographic hardware assets are differentially adjustable as part of optimization.

* * * * *